United States Patent
Chung et al.

(10) Patent No.: US 11,614,157 B2
(45) Date of Patent: Mar. 28, 2023

(54) ELECTRIC VEHICLE TRANSMISSION MECHANISM AND ELECTRIC VEHICLE

(71) Applicant: TECHWAY INDUSTRIAL CO., LTD., Taichung (TW)

(72) Inventors: Fu-Hsiang Chung, Taichung (TW); Chen-Chen Cheng, Taichung (TW); Chun-Tse Chan, Taichung (TW)

(73) Assignee: TECHWAY INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 17/654,819

(22) Filed: Mar. 15, 2022

(65) Prior Publication Data
US 2022/0307582 A1 Sep. 29, 2022

(30) Foreign Application Priority Data
Mar. 24, 2021 (TW) ................................ 110110671

(51) Int. Cl.
*F16H 57/021* (2012.01)
*F16H 3/54* (2006.01)

(52) U.S. Cl.
CPC ............ *F16H 57/021* (2013.01); *F16H 3/54* (2013.01); *F16H 2200/0021* (2013.01); *F16H 2200/2005* (2013.01)

(58) Field of Classification Search
CPC .. F16H 57/021; F16H 3/54; F16H 2200/0021; F16H 2200/2005

USPC ........................................................ 475/151
See application file for complete search history.

(56) References Cited

U.S. PATENT DOCUMENTS

| | | | | |
|---|---|---|---|---|
| 3,862,672 | A  * | 1/1975 | Tappen | F16H 57/021 |
| | | | | 184/6.12 |
| 11,441,664 | B2 * | 9/2022 | Katsumata | F16C 19/54 |
| 2018/0238384 | A1 * | 8/2018 | Katsuno | F16C 25/08 |
| 2018/0281897 | A1 * | 10/2018 | Huang | F16D 41/06 |
| 2018/0328349 | A1 * | 11/2018 | Wu | F04B 19/22 |
| 2019/0063590 | A1 * | 2/2019 | Pydin | F16H 57/021 |

FOREIGN PATENT DOCUMENTS

CN           210882487     *    8/2019

* cited by examiner

*Primary Examiner* — Colby M Hansen
(74) *Attorney, Agent, or Firm* — CKC & Partners Co., LLC

(57) ABSTRACT

An electric vehicle transmission mechanism which is applied to drive a chain wheel of an electric vehicle is provided. The electric vehicle transmission mechanism includes a transmission shaft, an output shaft, a lower bearing and an upper bearing. The transmission shaft is connected to the chain wheel and has a transmission axial direction, and the transmission shaft includes a transmission portion. The output shaft includes an output portion engaged with the transmission portion, and the output shaft has an output axial direction substantially perpendicular to the transmission axial direction. The lower bearing is sleeved on the output shaft. The upper bearing is sleeved on the output shaft and located between the lower bearing and the output portion.

10 Claims, 5 Drawing Sheets

ELECTRIC VEHICLE TRANSMISSION MECHANISM AND ELECTRIC VEHICLE

RELATED APPLICATIONS

This application claims priority to Taiwan Application Serial Number 110110671, filed Mar. 24, 2021, which is herein incorporated by reference.

BACKGROUND

Technical Field

The present disclosure relates to a vehicle transmission mechanism and a vehicle. More particularly, the present disclosure relates to an electric vehicle transmission mechanism and an electric vehicle.

Description of Related Art

In general, electric vehicles such as electric bicycles can employ a motor to provide kinetic power. The motor can be directly disposed at the front wheel or the rear wheel to directly drive the wheel axle. Because the motor has its own weight, when the motor is disposed at the front wheel or the rear wheel, the center of gravity of the electric vehicle is going to be unbalanced. Hence, some practitioners put the motor in the center of the frame to balance the center of gravity, and the configuration is so-called mid-drive motor.

The mid-drive motor is commonly disposed in the bottom bracket, and is in a configuration that the axis of the motor is parallel to the axis of the transmission axle of the chain wheel. However, this axis-parallel configuration will be restricted by the width of the bottom bracket, and therefore the structural design is limited. In order to solve the problem, the axis of the motor is set to be perpendicular to the axis of the transmission axle of the chain wheel, the motor is disposed inside the seat tube, and a transmission mechanism is employed to transmit the kinetic power, thereby increasing the space configuration flexibility.

However, vibrations caused by road conditions are easily generated during riding, and thus the structural stability of the transmission mechanism is very important. Hence, how to modify the structural configuration of the electric vehicle transmission mechanism to improve the stability of the electric vehicle transmission mechanism and the electric vehicle becomes a pursued target for practitioners.

SUMMARY

According to one aspect of the present disclosure, an electric vehicle transmission mechanism which is applied to drive a chain wheel of an electric vehicle is provided. The electric vehicle transmission mechanism includes a transmission shaft, an output shaft, a lower bearing and an upper bearing. The transmission shaft is connected to the chain wheel and has a transmission axial direction, and the transmission shaft includes a transmission portion. The output shaft includes an output portion engaged with the transmission portion, and the output shaft has an output axial direction substantially perpendicular to the transmission axial direction. The lower bearing is sleeved on the output shaft. The upper bearing is sleeved on the output shaft and located between the lower bearing and the output portion.

According to another aspect of the present disclosure, an electric vehicle is provided. The electric vehicle includes a frame having a vehicle length direction, a chain wheel disposed at the frame, and an electric vehicle transmission mechanism disposed at the frame and including a transmission shaft, an output shaft, a lower bearing and an upper bearing. The transmission shaft is connected to the chain wheel and has a transmission axial direction, and the transmission shaft includes a transmission portion. The output shaft includes an output portion engaged with the transmission portion, and the output shaft has an output axial direction substantially parallel to the vehicle length direction and perpendicular to the transmission axial direction. The lower bearing is sleeved on the output shaft. The upper bearing is sleeved on the output shaft and located between the lower bearing and the output portion.

BRIEF DESCRIPTION OF THE DRAWINGS

The disclosure can be more fully understood by reading the following detailed description of the embodiments, with reference made to the accompanying drawings as follows.

DETAILED DESCRIPTION

It will be understood that when an element (or mechanism or module) is referred to as being "disposed on", "connected to" or "coupled to" another element, it can be directly disposed on, connected or coupled to the other element, or intervening elements may also be present. In contrast, when an element is referred to as being "directly disposed on", "directly connected to" or "directly coupled to" another element, there are no intervening elements present.

In addition, the terms first, second, third, etc. are used herein to describe various elements or components, these elements or components should not be limited by these terms. Consequently, a first element or component discussed below could be termed a second element or component.

Figure 1:
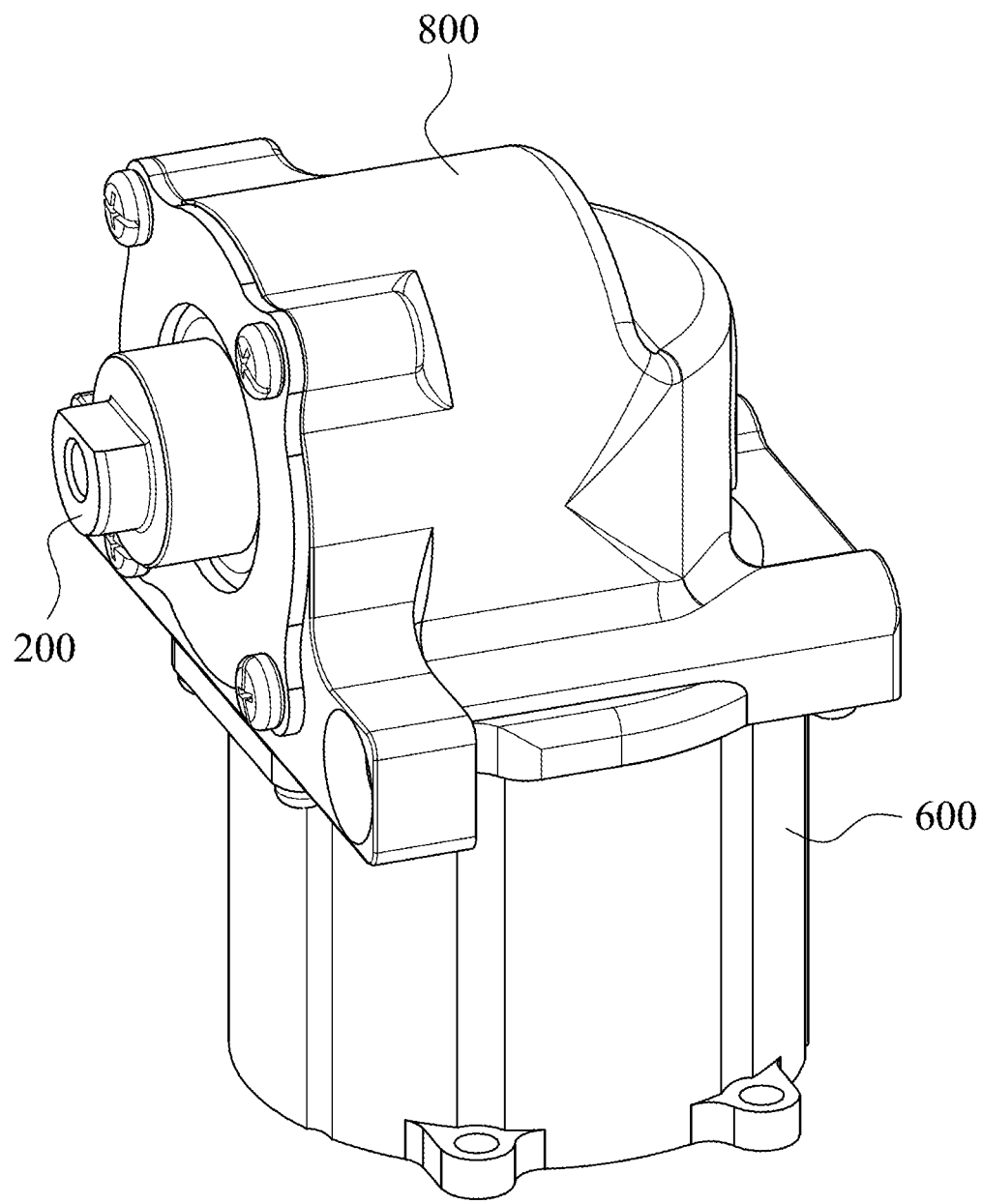
FIG. 1 shows a three dimensional schematic view of an electric vehicle transmission mechanism according to one embodiment of the present disclosure.
Figure 2:
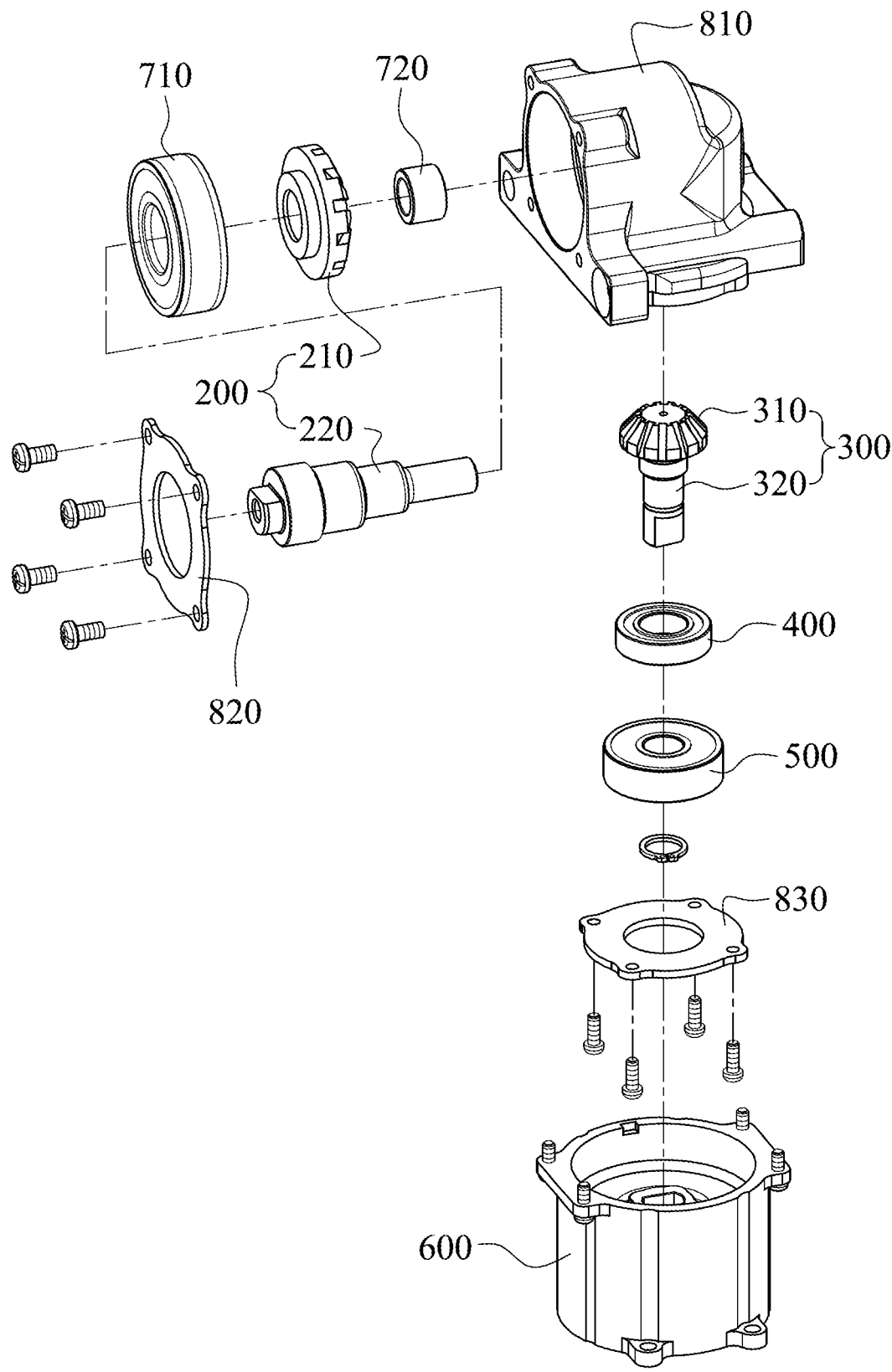
FIG. 2 shows an exploded view of the electric vehicle transmission mechanism of FIG. 1.
Figure 3:
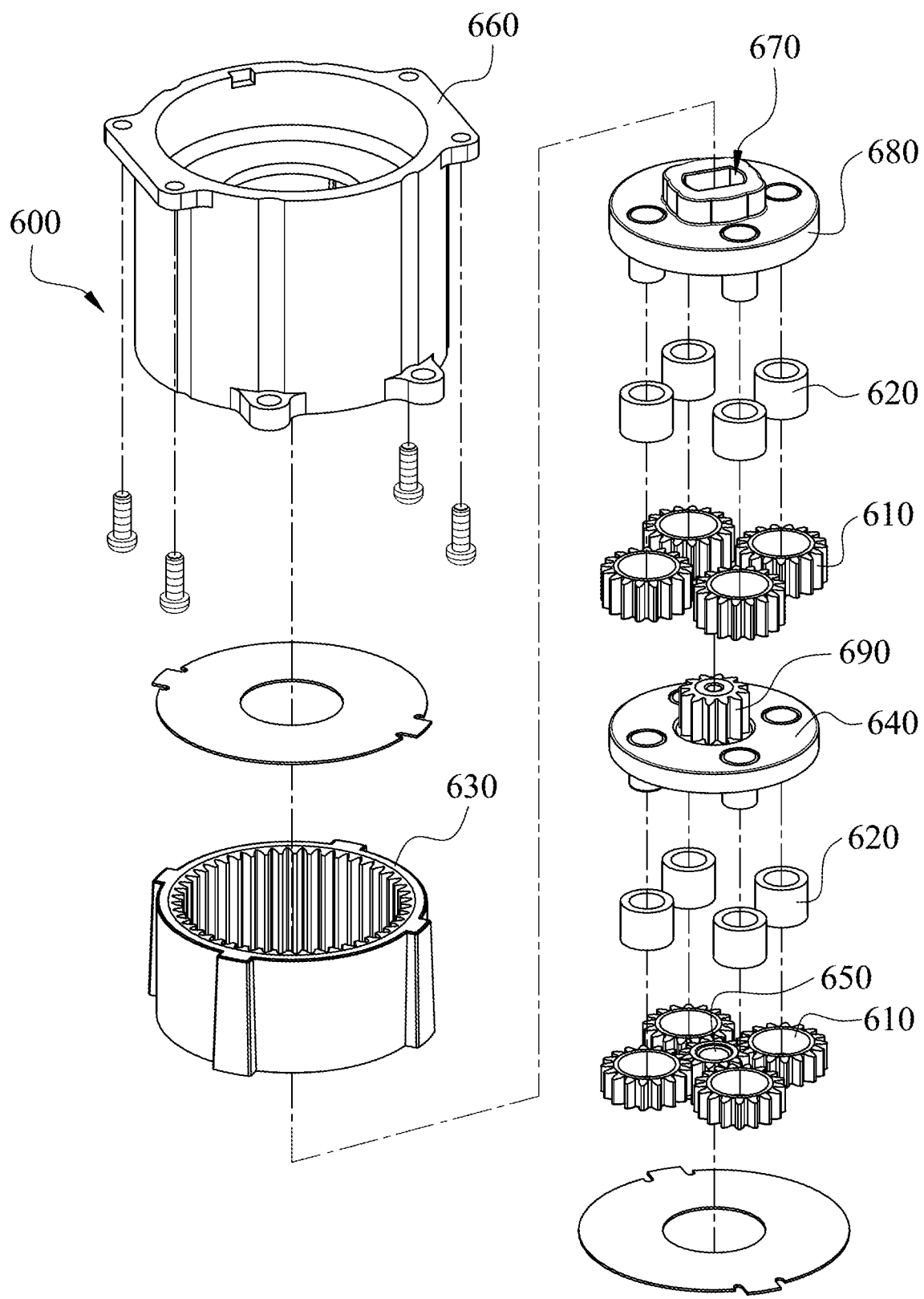
FIG. 3 shows an exploded view of a reduction module of the electric vehicle transmission mechanism of FIG. 1.
Figure 4:
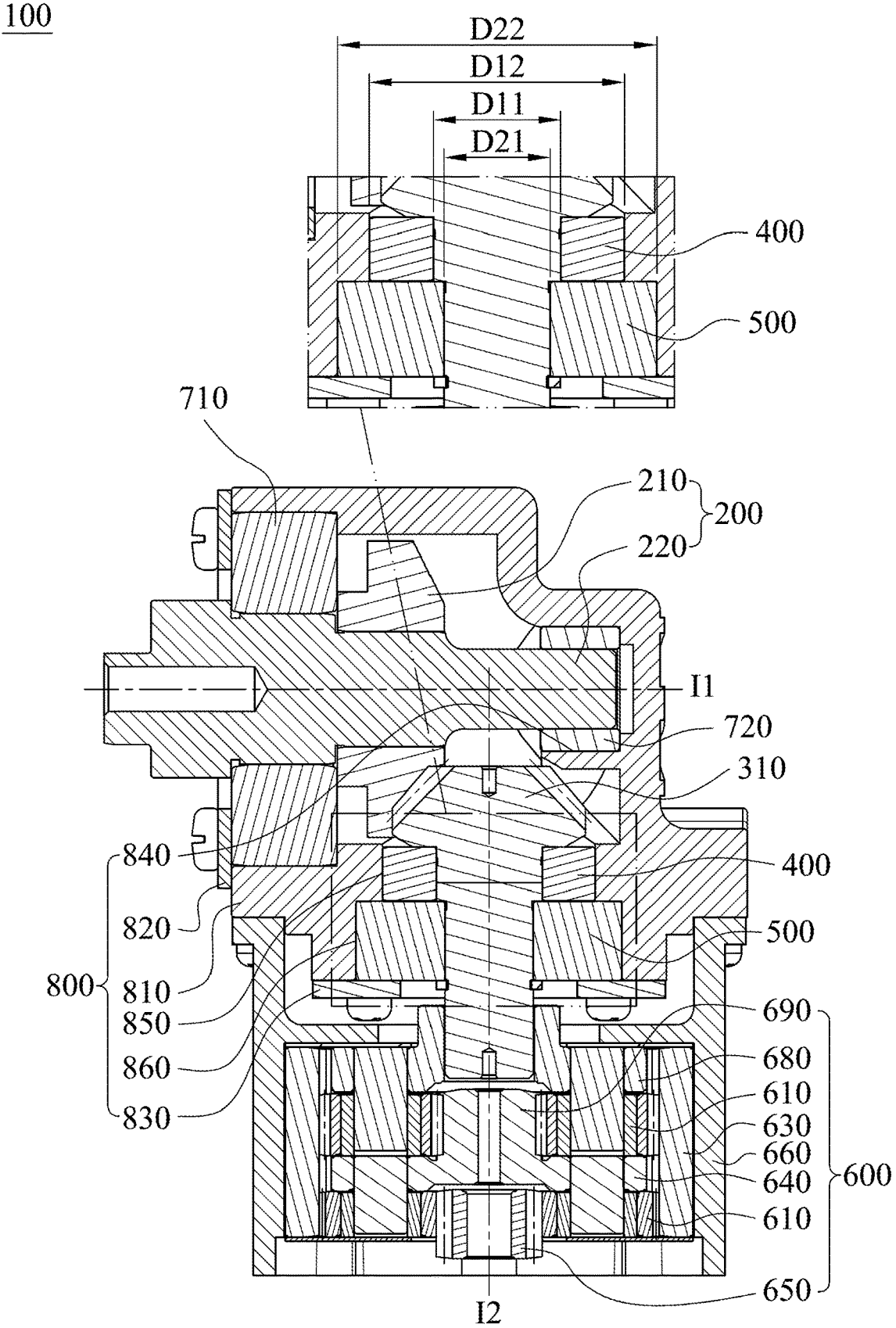
FIG. 4 shows a cross-sectional view of the electric vehicle transmission mechanism of FIG. 1.

FIG. 1 shows a three dimensional schematic view of an electric vehicle transmission mechanism 100 according to one embodiment of the present disclosure. FIG. 2 shows an exploded view of the electric vehicle transmission mechanism 100 of FIG. 1. FIG. 3 shows an exploded view of a reduction module 600 of the electric vehicle transmission mechanism 100 of FIG. 1. FIG. 4 shows a cross-sectional view of the electric vehicle transmission mechanism 100 of FIG. 1. Please refer to FIGS. 1 to 4, an electric vehicle transmission mechanism 100 which is applied to drive a chain wheel (not shown in FIGS. 1 to 4) of an electric vehicle is provided. The electric vehicle transmission mechanism 100 includes a transmission shaft 200, an output shaft 300, a lower bearing 500 and an upper bearing 400. The transmission shaft 200 is connected to the chain wheel and has a transmission axial direction I1, and the transmission shaft 200 includes a transmission portion 210. The output shaft 300 includes an output portion 310 engaged with the transmission portion 210, and the output shaft 300 has an output axial direction I2 substantially perpendicular to the transmission axial direction I1. The lower bearing 500 is sleeved on the output shaft 300. The upper bearing 400 is sleeved on the output shaft 300 and located between the lower bearing 500 and the output portion 310.

Therefore, through the configuration of the upper bearing 400 and the lower bearing 500, the structural stability of the electric vehicle transmission mechanism 100 can be improved, and the electric vehicle transmission mechanism 100 has advantages of balancing the load and increasing the life time. The details of the electric vehicle transmission mechanism 100 will be described hereinafter.

The transmission shaft 200 can further include a transmission shaft body 220, and the transmission portion 210 has a bevel gear structure and is sleeved on the transmission shaft body 220. The electric vehicle transmission mechanism 100 can further include a case 800, a first transmission bearing 710 and a second transmission bearing 720. The case 800 includes a case body 810, a side cover 820 and a lower cover 830. The transmission shaft 200 is located within a receiving space formed by the case body 810, and the first transmission bearing 710 and the second transmission bearing 720 support two end of the transmission shaft body 220, respectively. The side cover 820 is secured on one side of the case body 810 and includes an opening (not labeled) configured for one end of the transmission shaft body 220 to protrude therefrom for connecting the chain wheel. The case 800 can further include a supporting groove 840, a first receiving groove 850 and a second receiving groove 860. The supporting groove 840 is located at the other side of the case body 810 and is communicated with the receiving space. The first receiving groove 850 and the second receiving groove 860 are adjacent to each other and located within the case body 810. The supporting groove 840 is configured to support the second transmission bearing 720. The first receiving groove 850 is configured to receive the upper bearing 400, and the second receiving groove 860 is configured to receive the lower bearing 500, which can increase the structural stability.

The output shaft 300 can further include an output shaft body 320, and the output portion 310 also has a bevel gear structure. Precisely, the output portion 310 has a spiral bevel gear structure and is connected to an upper end of the output shaft body 320. The upper bearing 400 and the lower bearing 500 are sequentially sleeved on the output shaft body 320, and the output shaft 300, the upper bearing 400 and the lower bearing 500 are also received in the receiving space of the case body 810. The lower cover 830 is screwed with the case body 810 to restrict the lower bearing 500.

As shown in the embodiment of FIGS. 1 to 4, the upper bearing 400 can have an upper bearing inner diameter D11, the lower bearing 500 can have a lower bearing inner diameter D21, and the upper bearing inner diameter D11 is larger than the lower bearing inner diameter D21. Therefore, during assembling, the upper bearing 400 can be assembled in the case body 810 first, then the lower bearing 500 can be assembled in the case body 810, and, with the configuration that the upper bearing inner diameter D11 is larger than the lower bearing inner diameter D21, the interference caused by the pressing process can be prevented. Please be noted that, although the upper bearing 400 and the lowering bearing 500 are illustrated in FIG. 4 as being contacted to each other, a gap is actually contained therebetween, the separation relationship is not shown in the drawings owing to the scaling relation, and the present disclosure is not limited by the drawings.

In addition, the upper bearing 400 can have an upper bearing outer diameter D12, the lower bearing 500 can have a lower bearing outer diameter D22, and the upper bearing outer diameter D12 is smaller than or equal to the lower bearing outer diameter D22. Since an axial force parallel to the output axial direction I2 will be generated as the spiral bevel gear structure is rotated, the lower bearing 500 can be used to bear the axial force. To be more specific, the upper bearing 400 can be used for aligning the center without bearing the axial force, and the lower bearing 500 can be used to bear the axial force. Hence, as the axial force generated by the output portion 310 is a downward axial force, the lower bearing 500 can directly bear the downward axial force. In addition, with the configuration that the upper bearing outer diameter D12 is smaller than the lower bearing outer diameter D22, the case body 810 can rest on the lower bearing 500. Even the axial force generated by the output portion 310 is an upward axial force, the upward axial force can be transferred to the case body 810 and then to the lower bearing 500, and the lower bearing 500 can still bear the upward axial force. Therefore, as the lower bearing outer diameter D22 is larger than or equal to the upper bearing outer diameter D12, the lower bearing 500 has larger area or volume to bear a larger axial force. Moreover, the lower bearing 500 can have an angular contact ball bearing structure, thereby increasing the force bearing capability of the lower bearing 500 in the output axial direction I2. The angle of the angular contact ball bearing structure can be within a range from 15 degrees to 50 degrees, in the embodiment being illustrated as 40 degrees, and the present disclosure is not limited thereto. In other embodiments, the upper bearing can, but not limited to, have an angular contact ball bearing structure. Furthermore, the lower cover 830 can be made of high-carbon steel such as SK7, and a thickness thereof is larger than 1.5 cm, thereby bearing a larger axial force. In the embodiment, the thickness of the lower cover 830 is, but not limited to, 2 cm.

The electric vehicle transmission mechanism 100 can further include a reduction module 600 connected to the output shaft 300 and including at least one planet gear 610, and the upper bearing 400 and the lower bearing 500 are located between the output portion 310 and the reduction module 600. Moreover, a number of the at least one planet gear 610 is more than three, and the reduction module 600 can further include at least one grease-contained copper sleeve 620 configured for the at least one planet gear 610 to be sleeved thereon.

As shown in FIGS. 3 and 4, the reduction module 600 has a double-layer structure. The first layer is configured by four planet gears 610, four grease-contained copper sleeves 620, a sun gear 650 and a gear plate 640. The four grease-contained copper sleeves 620 are sleeved on pins of the gear plate 640, respectively, the four planet gears 610 are sleeved on the four grease-contained copper sleeves 620, respectively, and the sun gear 650 is located in the center and engaged with the four planet gears 610. The second layer is configured by four planet gears 610, four grease-contained copper sleeves 620, a sun gear 690 and a gear plate 680, the connection relationship is similar to the first layer, and the eight planet gears 610 are all engaged with the ring gear 630. Moreover, the gear plate 680 of the second layer includes a hole 670, the end of the output shaft body 320 corresponding to the output portion 310 is limited in the hole 670. The reduction module 600 can further include a shell 660 connected to the case body 810. The ring gear 630, the planet gears 610, the grease-contained copper sleeves 620, the sun gears 650, 690 and the gear plates 640, 680 are all received in the shell 660.

In transmission, the axle of the motor (not shown in FIGS. 1 to 4) can be inserted into the sun gear 650 of the first layer, and the sun gear 650 of the first layer can be driven to cause revolution of the planet gears 610 in the ring gear 630, thereby rotating the gear plate 640 of the first layer and the sun gear 690 of the second layer. Consequently, the planet gears 610 of the second layer can be revolved in the ring gear 630 to drive the gear plate 680, the output shaft 300 can be then driven, and the reduction effect can be achieved.

Figure 5:
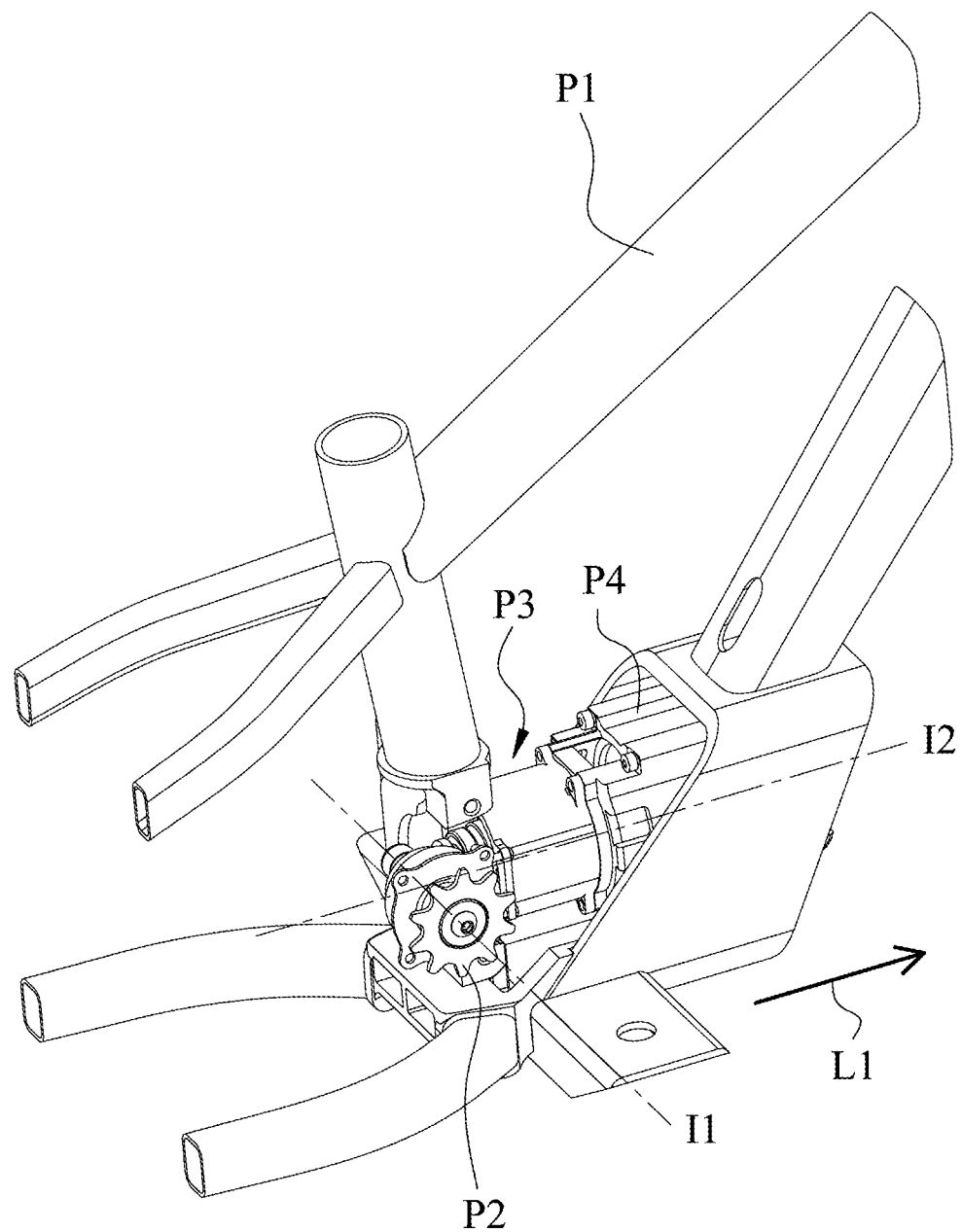
FIG. 5 shows a partial schematic view of an electric vehicle according to another embodiment of the present disclosure.

FIG. 5 shows a partial schematic view of an electric vehicle according to another embodiment of the present disclosure. The electric vehicle includes a frame P1 having a vehicle length direction L1, a chain wheel P2 disposed at the frame P1, and an electric vehicle transmission mechanism P3 disposed at the frame P1. The electric vehicle transmission mechanism P3 is identical to the electric vehicle transmission mechanism 100 shown in FIGS. 1 to 4. The output axial direction I2 is substantially parallel to the vehicle length direction L1, and the transmission axial direction I1 is parallel to the vehicle width direction and is substantially perpendicular to the output axial direction I2.

As shown in FIG. 5, the electric vehicle transmission mechanism P3 can be disposed at the bottom bracket of the frame P1, and the motor P4 can be disposed at a position near the down tube of the frame P1. After the motor P4 is actuated, the kinetic power can be transmitted to the chain wheel P2 by the electric vehicle transmission mechanism P3, and the rear wheel can be rotated by the chain (not shown) of the chain wheel P2. Please be noted that the electric vehicle shown in FIG. 5 is illustrated as a pedal-less electric bicycle, and only a part of the electric vehicle is shown for clear and concise illustration. The present disclosure is not limited thereto.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. An electric vehicle transmission mechanism, which is applied to drive a chain wheel of an electric vehicle, the electric vehicle transmission mechanism comprising:
    a transmission shaft connected to the chain wheel and having a transmission axial direction, the transmission shaft comprising a transmission portion;
    an output shaft comprising an output portion engaged with the transmission portion, the output shaft having an output axial direction substantially perpendicular to the transmission axial direction;
    a lower bearing sleeved on the output shaft; and
    an upper bearing sleeved on the output shaft and located between the lower bearing and the output portion;
    wherein the upper bearing has an upper bearing inner diameter, the lower bearing has a lower bearing inner diameter, and the upper bearing inner diameter is larger than the lower bearing inner diameter.

2. The electric vehicle transmission mechanism of claim 1, wherein the upper bearing has an upper bearing outer diameter, the lower bearing has a lower bearing outer diameter, and the upper bearing outer diameter is smaller than or equal to the lower bearing outer diameter.

3. The electric vehicle transmission mechanism of claim 1, wherein the lower bearing has an angular contact ball bearing structure.

4. The electric vehicle transmission mechanism of claim 1, further comprising:
    a reduction module connected to the output shaft and comprising at least one planet gear;
    wherein the upper bearing and the lower bearing are located between the output portion and the reduction module.

5. The electric vehicle transmission mechanism of claim 4, wherein a number of the at least one planet gear is equal to or larger than three.

6. The electric vehicle transmission mechanism of claim 4, wherein the reduction module further comprises:
    at least one grease-contained copper sleeve configured for the at least one planet gear to be sleeved thereon.

7. An electric vehicle, comprising:
    a frame having a vehicle length direction;
    a chain wheel disposed at the frame; and
    an electric vehicle transmission mechanism disposed at the frame and comprising:
        a transmission shaft connected to the chain wheel and having a transmission axial direction, the transmission shaft comprising a transmission portion;
        an output shaft comprising an output portion engaged with the transmission portion, the output shaft having an output axial direction substantially parallel to the vehicle length direction and perpendicular to the transmission axial direction;
        a lower bearing sleeved on the output shaft; and
        an upper bearing sleeved on the output shaft and located between the lower bearing and the output portion;
    wherein the upper bearing has an upper bearing inner diameter, the lower bearing has a lower bearing inner diameter, and the upper bearing inner diameter is larger than the lower bearing inner diameter.

8. The electric vehicle of claim 7, wherein the upper bearing has an upper bearing outer diameter, the lower bearing has a lower bearing outer diameter, and the upper bearing outer diameter is smaller than or equal to the lower bearing outer diameter.

9. The electric vehicle of claim 7, wherein the lower bearing has an angular contact ball bearing structure.

10. The electric vehicle of claim 7, further comprising:
    a reduction module connected to the output shaft and comprising:
        at least one planet gear; and
        at least one grease-contained copper sleeve configured for the at least one planet gear to be sleeved thereon;
    wherein the upper bearing and the lower bearing are located between the output portion and the reduction module.

* * * * *